Patented July 11, 1950

2,515,095

UNITED STATES PATENT OFFICE 2,515,095

PROCESS OF FRACTIONATING STARCH

Thomas John Schoch, La Grange, Ill., assignor to Corn Products Refining Company, New York, N. Y., a corporation of New Jersey No Drawing. Application May 15, 1947, Serial No. 748,349

10 Claims. (Cl. 127—71)

This invention relates to a method of fractionating starch.

According to present concepts of the chemistry of starch, most natural starches are now considered to be mixtures of two types of polymers; one is essentially linear in molecular configuration and is referred to herein as the A-fraction; and the other, the major portion, is highly branched in molecular configuration and is referred to herein as the B-fraction.

Various methods have been proposed in the past for the separation of the A-fraction and the B-fraction of starch. One method proposed consists of saturating an autoclaved starch solution with n-butyl or n-amyl alcohol, whereby the A-fraction precipitates as an insoluble crystalline complex with the alcohol (Schoch, Cereal Chemistry 18, 127–128 (1941)). After removal of the A-fraction by the use of a supercentrifuge, the B-fraction was recovered from the mother liquor by addition of an excess of methanol. By a later alternative method the starch was autoclaved in water which had been saturated with butyl alcohol to effect solution of the starch, then the starch solution was cooled to room temperature to precipitate the A-fraction (Schoch, J. Am. Chem. Soc. 64, 2957–2961 (1942)). Attempts to precipitate the B-fraction, remaining in solution after removal of the A-fraction, by refrigeration or long standing were not successful.

While the above procedures are satisfactory on a laboratory basis, they are not economical for large scale processing. Large quantities of methanol are required to precipitate the B-fraction from solution and the methanol must be recovered from a ternary mixture containing water and butyl alcohol. Alcoholic flocculation of the B-fraction might be omitted and the latter substance recovered by spray-drying or roll-drying the centrifugate. However, the steam costs involved for drying would be prohibitive and difficulties would be encountered in the recovery of butyl alcohol remaining in the centrifugate.

An object of the present invention is to provide an improved process for the fractionation of starch into its A- and B-fractions. A further object is to provide a continuous process for the fractionation of starch.

I have made the surprising discovery that starch may be fractionated into its A- and B-fractions by dissolving starch in a suitable medium and causing the fractions of the starch to precipitate at different temperature levels. More specifically, a solution of starch is effected, at elevated temperature, in a suitable alcohol-water medium, the solution cooled sufficiently to precipitate the A-fraction, the A-fraction separated, the remaining liquor subsequently cooled to precipitate the B-fraction and the B-fraction separated.

In carrying out the process of the present invention, it is preferable to paste the starch in a hot aqueous alcohol mixture of desired concentration to be hereinafter specified and then effect solution of the swollen starch by autoclaving or by prolonged boiling under reflux. As an alternative procedure, the starch may be pasted in hot water, autoclaved or boiled to effect solution of the starch granules and then alcohol added to give the desired concentration. The first method is preferred by reason of the fact that dissolution of the swollen granules is more readily effected in the presence of moderate amounts of alcohol. As a further advantage, the first method affords a better fractionation of those cereal starches which contain a small amount of natural fatty acid. Such lipid materials tend to inhibit swelling and solution of the starch granule and it is, therefore, advisable to use defatted starch when operating by the second method. When raw cereal starch is pasted in aqueous alcohol, the latter appears to dissolve the lipid material and prevent its undesirable effect on the starch. The addition of a small amount of electrolyte, e. g., sodium chloride, to the solution of starch appears to assist the formation of the A-fraction complex in crystalline form. To avoid degradation of the starch substance it is preferable to maintain the pH value of the solution of starch within the range of 5.9 to 6.3.

After the solution of starch in the aqueous alcohol has been effected, the solution is cooled sufficiently to precipitate the A-fraction. While precipitation usually occurs in the range of 50 to 70° C. (except when tertiary amyl alcohol is used and precipitation occurs at 90 to 100° C.) the usual practice is to cool the solution to room temperature before removing the A-fraction. It is advisable to stir the system continuously during the cooling period.

After the A-fraction complex is precipitated, it may be separated by various means, for example, the use of a continuous flow supercentrifuge, preferably of a vapor-sealed type to minimize evaporation of alcohol. When low concentrations of starch are employed, the A-fraction may be separated by simple sedimentation or the system may be allowed to settle, the supernatant liquid removed and the heavy slurry of A-fraction material passed through a supercentrifuge.

After the A-fraction has been removed, the resulting solution containing the B-fraction is then cooled below room temperature by suitable means as, for example, by means of refrigerated coils or by the addition of ice. Usually the B-fraction flocculates spontaneously by the time the temperature of the solution is lowered to 3 to 4° C., although occasionally agitation may be required to initiate flocculation. While it may be advantageous to cool the system as low as possible, in no case does this invention contemplate freezing of the solvent medium.

The B-fraction usually precipitates as a fairly compact curd and the supernatant liquor may be readily drawn off or decanted. In some cases, the floc of the B-fraction remains suspended and must be recovered by such means as centrifugation. Once the B-fraction has been precipitated by refrigeration, subsequent operations may be conducted at room temperature since the precipitated B-fraction does not redissolve when the system returns to 20 to 30° C.

When starch is fractionated in accordance with the principles of the present invention, the A- and B-fractions are recovered as wet precipitates which may be used as such or which may be dried by any suitable means.

Any aliphatic alcohol containing from 1 to 5 atoms of carbon or mixtures thereof having prerequisite solubility characteristics in water may be used for purposes of the present invention. The total amount of alcohol or of combined alcohols dissolved in the aqueous phase of the mixture of alcohol and water, in which solution of starch is effected, should be about 10 to 15 volume percent at 0° C. Among the alcohols which are satisfactory for purposes of the present invention are methanol, ethyl alcohol, n-propyl alcohol, isopropyl alcohol, tertiary butyl alcohol, secondary butyl alcohol and tertiary amyl alcohol. Methanol and ethyl alcohol are not quite as effective in the process of the present invention as are the other mentioned alcohols. Among the alcohols which may be used in combination with the above mentioned alcohols are isobutyl alcohol, n-amyl alcohol, isoamyl alcohol and pentanol-3. The term aliphatic alcohol as used herein is intended to include the mixture of alcohols referred to above. The terms referring to dissolving starch and effecting a solution of starch as used herein are intended to include the methods specified hereinabove.

For successful practice of the present invention, the concentration of alcohol in the alcohol and water mixture (which is usually a solution depending upon the solubility of the alcohol in water) must be maintained within certain limits. If the concentration of the alcohol is too low, the A-fraction may be satisfactorily precipitated on cooling the solution to room temperature but flocculation of the B-fraction will not be effected by subsequent cooling. On the other hand, if the concentration of alcohol is too high, the entire starch substance is precipitated at or above room temperature and no fractionation is obtained.

The minimal amount of alcohol which may be employed in accordance with the principles of the present invention may range from about 10 to about 15 volume percent. The amount of alcohol employed must not be sufficient to precipitate the B-fraction at a temperature of 20 to 40° C. The maximal amount of alcohol may range from about 25 to 35 volume percent. More specifically the maximal working concentration is approximately 25 volume percent for methanol, 30 volume percent for ethyl alcohol, 35 volume percent for n-propyl and isopropyl alcohols and 25 volume percent for tertiary butyl alcohol. Due to their limited solubility, there is no detrimental effect in the use of excess secondary butyl or tertiary amyl alcohols. However, only that portion of the alcohol dissolved in the aqueous phase of the alcohol and water mixture is effective in precipitating the B-fraction.

Optimal operation is generally effected with median concentrations of the alcohol, e. g., 25 to 30 volume percent for n-propyl alcohol, 20 to 25 volume percent for isopropyl alcohol, 15 to 20 volume percent for secondary butyl alcohol and 15 to 20 volume percent for tertiarybutyl alcohol.

For optimal fractionation, the concentration of the starch in the aqeous alcohol mixture or solution should not exceed about 3 percent. At higher concentrations, the viscosity of the starch interferes with crystallization of the A-fraction and likewise causes difficulty in centrifuging operations. However, starch concentrations as high as 7 percent may be used in accordance with the process of the present invention, although the products are not as pure as those obtained at lower concentrations.

The principles of the present invention are applicable to corn starch, tapioca starch, potato starch, sago starch, and any other granular starches containing "normal" amounts of A-fraction (viz., 15 to 35%).

The process of the present invention is readily adapted to a closed cycle operation and the alcohol-water mixture, after removal of the B-fraction, may be used as the medium for gelatinization and processing a fresh batch of starch.

The following examples which are intended as informative and typical only and not in a limiting sense will further illustrate the invention, which is intended to be limited only in accordance with the scope of the appended claims.

Iodine affinities referred to in the examples were determined by the method of Wilson, Schoch and Hudson (J. Am. Chem. Soc., 65, 1381 (1943)). Recovery of A-fraction was calculated as $$\text{Per cent yield of A-fraction} \times \frac{\text{iodine affinity of A-fraction}}{5.3}$$

wherein the value of 5.3 represents the iodine affinity of defatted whole corn starch. It is obvious that this formula can be employed only when there is definite evidence that fractionation has been effected, as indicated by the iodine affinities of the two fractions. The yield of B-fraction is equal to 100 percent minus the yield of A-fraction, less any mechanical losses.

*Example 1.*—Two hundred grams (on dry basis) of raw corn starch was suspended in a mixture of 4 l. of 1 percent sodium chloride solution and 1 l. of secondary butyl alcohol. The starch was gelatinized by heating, then the paste boiled for 3 hours under reflux, vigorous agitation being maintained during this period. The mixture was cooled to room temperature and the A-fraction collected in a supercentrifuge. The centrifugate was refrigerated overnight at 3 to 4° C. to flocculate the B-fraction. The supernatant solution was removed and used directly for processing of a second batch of starch. Iodine affinities of the A-fraction and B-fractions were 10.3 percent and 1.75 percent, respectively.

*Example 2.*—Two hundred and fifty grams of defatted corn starch was gelatinized in 10 l. of hot water and the resulting paste autoclaved for 2 hours at 20 pounds steam pressure to effect solution of the starch. After being cooled to 90° C., 2 l. of tertiary amyl alcohol was added to the solution, the hot mixture stirred for 5 to 10 minutes, then passed through a supercentrifuge. The A-fraction deposited in the rotor of the centrifuge. The centrifugate containing the B-fraction was cooled to room temperature, then placed in the refrigerator overnight, the temperature reaching 3° C. The B-fraction separated as a curdy precipitate, from which the supernatant liquid was readily decanted and drained. Both fractions were dehydrated with alcohol, dried and analyzed for iodine affinity.

Yield of A-fraction=30 per cent
Yield of B-fraction=70 per cent (by difference)
Iodine affinity of A-fraction=15.4 percent
Iodine affinity of B-fraction=0.56 per cent
Fractionation efficiency=87 per cent (of theory)

*Example 3.*—One hundred grams of raw corn starch (containing a normal amount of fatty acid) was gelatinized in a boiling mixture of 2 l. of water and 400 ml. of tertiary amyl alcohol. The pH value of the paste was adjusted to 6.45 with potassium phosphate buffer, then the paste was placed in a pressure vessel and heated for 30 minutes at 155° C. (110 lb. vapor pressure), the mixture being stirred during this operation. After cooling to approximately 90° C., the precipitated A-fraction was supercentrifuged, giving a dense paste of A-fraction. The supernatant solution was cooled and refrigerated, as in Example 2 causing flocculation of the B-fraction.

Yield of A-fraction=30 per cent
Yield of B-fraction=70 per cent (by difference)
Iodine affinity of A-fraction=12.5 per cent
Iodine affinity of B-fraction=0.99 per cent
Fractionation efficiency=71 per cent (of theory)

*Example 4.*—One hundred and eighty-five gallons of distilled water was heated to 190° F. in an autoclave having a capacity of 300 gals. Mixed phosphate buffer (97 g. $K_2HPO_4$–443 g. $KH_2PO_4$) was added to maintain the pH within limits of 5.9 to 6.3. Seventy pounds of commercial corn starch (calculated on dry starch basis) was suspended in 15 gallons of water and this mixture added slowly to the hot water in the autoclave, with continuous agitation to give a smooth paste. The latter was then autoclaved for 2 hours at 255° F. (15 lbs. internal pressure), then cooled to 180° F. and 55 gallons of 91 percent isopropyl alcohol added, under reflux. Agitation was continued during all these operations. The mixture was then allowed to cool to room temperature over a period of 48 hours and the precipitated A-fraction collected in a supercentrifuge. The centrifugate was returned to the autoclave and cooled to 40° F., by circulating cold well water through the jacket overnight followed by ice water for 3 to 4 hours. The system was stirred continuously during this cooling period. After flocculation of the B-fraction, cooling and agitation were discontinued and the precipitate allowed to settle for 16 hours. The supernatant solution was then drawn off and the precipitated B-fraction dehydrated with alcohol and dried.

On three batches of A-fraction prepared in the above manner, the iodine affinities were 11.4 percent, 11.8 percent and 10.8 percent; values for the corresponding B-fractions were 1.5 percent, 1.1 percent and 1.3 percent, respectively.

Yield of A-fraction=38, 39, 42 per cent
(crude material) (respectively)

In a similar run, but using well water and starch at a concentration of 3 percent instead of 4 percent, the iodine affinities of the A- and B-fractions were 14.5 percent and 1.9 percent, respectively.

Yield of A-fraction=27 percent

In a similar run using distilled water, 3 percent starch concentration and 0.5 percent common salt (to assist precipitation and flocculation), the fractions assayed 15.9 percent and 1.6 percent iodine affinity, respectively.

Yield of A-fraction=26 percent

I claim:

1. The process of fractionating starch into its A- and B-fractions which comprises effecting a solution of starch, at elevated temperature, in a mixture of water and aliphatic alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol containing from 1 to 5 atoms of carbon and capable of being dissolved in the aqueous phase of said mixture to the extent of about 10 to 15 volume percent at 0° C. and being present in the system to the extent of about 10 to about 35 percent of the volume of said mixture; the concentration of starch in said solution not exceeding about 7 percent.

2. The process of fractionating starch into its A- and B-fractions which comprises effecting solution of corn starch, at elevated temperature, in a mixture of water and aliphatic alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol containing from 1 to 5 atoms of carbon and capable of being dissolved in the aqueous phase of said mixture to the extent of about 10 to 15 volume percent at 0° C. and being present in the system to the extent of about 10 to about 35 percent of the volume of said mixture; the concentration of starch in said solution not exceeding about 7 percent.

3. The process of fractionating starch into its A- and B-fractions which comprises effecting solution of starch, at elevated temperature, in a mixture of water and isopropyl alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol being present to the extent of about 20 to about 25 percent of the volume of said mixture; the concentration of starch in said solution not exceeding about 3.3 percent.

4. The process of fractionating starch into its A- and B-fractions which comprises effecting solution of starch, at elevated temperature, in a mixture of water and secondary butyl alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol being present to the extent of about 15 to about 20 percent of the volume of said mixture; the concentration of starch in said solution not exceeding about 4 percent.

5. The process of fractionating starch into its A- and B-fractions which comprises effecting solution of potato starch, at elevated temperature, in a mixture of water and isopropyl alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol being present to the extent of about 20 to about 25 percent of the volume of said mixture; the concentration of starch in said solution not exceeding about 3 percent.

6. The process of fractionating starch into its A- and B-fractions which comprises effecting a solution of tapioca starch, at elevated temperature, in a mixture of water and isopropyl alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol being present to the extent of about 20 to about 25 percent of the volume of said mixture; the concentration of starch in said solution not exceeding about 3 percent.

7. The process of fractionating starch into its A- and B-fractions which comprises effecting a solution of corn starch, at elevated temperature, in a mixture of water and isopropyl alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol being present to the extent of about 20 to about 25 percent of the volume of said mixture; the concentration of starch in said solution not exceeding about 7 percent.

8. The process according to claim 1 wherein the pH value of the solution of starch is maintained between 5.9 and 6.3.

9. The process of fractionating starch into its A- and B-fractions, which comprises effecting a solution of starch at elevated temperature in a mixture of water and isopropyl alcohol, cooling the solution to room temperature to effect precipitation of the A-fraction, separating the A-fraction, cooling the solution after removal of the A-fraction to about 1 to 4° C. to effect precipitation of the B-fraction; said alcohol being present to the extent of about 20 to about 25 percent of the volume of said mixture; the concentration of said starch in said solution not exceeding about 7 percent.

10. The process of fractionating corn starch into its A- and B-fractions, which comprises effecting a solution of starch at a temperature of about 155° C. in a mixture of water and tertiary amyl alcohol, cooling the solution to approximately 90° C., separating the A-fraction, cooling the solution after removal of the A-fraction to about 3° C. to effect precipitation of the B-fraction and separating the B-fraction; said alcohol being present to the extent of about 12.5 percent of the volume of said mixture; the concentration of starch in said solution being about 4 percent.

THOMAS JOHN SCHOCH.

REFERENCES CITED

The following references are of record in the file of this patent:

J. Soc. Chem. Ind., vol. 60, pages 99–111 (1941).
Z. Physik Chem. A188, pages 137–159 (1941).
J. Am. Chem. Soc. V. 65, pages 1154–1157 (1943).
Hilbert et al., "Pea Starch, a Starch of High Amylose Content," J. of Biol. Chem., Feb. 1946, pages 229–238, page 231 pertinent.
Kerr, Chem. and Ind. of Starch, N. Y. 1944, pages 129–151.